US008280860B2

(12) United States Patent
Spackman et al.

(10) Patent No.: US 8,280,860 B2
(45) Date of Patent: Oct. 2, 2012

(54) METHOD FOR INCREASING DEDUPLICATION SPEED ON DATA STREAMS FRAGMENTED BY SHUFFLING

(75) Inventors: Stephen P. Spackman, San Jose, CA (US); Don Doerner, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 159 days.

(21) Appl. No.: 12/946,779

(22) Filed: Nov. 15, 2010

(65) Prior Publication Data

US 2012/0124011 A1 May 17, 2012

(51) Int. Cl.
*G06F 17/30* (2006.01)
(52) U.S. Cl. ........................................... 707/692
(58) Field of Classification Search .................... 707/692
See application file for complete search history.

(56) References Cited

U.S. PATENT DOCUMENTS

| | | | | |
|---|---|---|---|---|
| 8,060,715 | B2 * | 11/2011 | Cremelie et al. | 711/162 |
| 8,180,740 | B1 * | 5/2012 | Stager et al. | 707/692 |
| 2008/0005141 | A1 * | 1/2008 | Zheng et al. | 707/101 |
| 2008/0294696 | A1 * | 11/2008 | Frandzel | 707/200 |
| 2009/0313248 | A1 * | 12/2009 | Balachandran et al. | 707/6 |
| 2010/0037118 | A1 * | 2/2010 | Saliba et al. | 714/752 |
| 2010/0042790 | A1 * | 2/2010 | Mondal et al. | 711/161 |
| 2010/0114833 | A1 * | 5/2010 | Mu | 707/650 |
| 2010/0250858 | A1 * | 9/2010 | Cremelie et al. | 711/136 |
| 2010/0312752 | A1 * | 12/2010 | Zeis et al. | 707/640 |
| 2011/0022825 | A1 * | 1/2011 | Spackman | 712/240 |
| 2011/0099154 | A1 * | 4/2011 | Maydew et al. | 707/692 |
| 2011/0099351 | A1 * | 4/2011 | Condict | 711/216 |
| 2011/0231362 | A1 * | 9/2011 | Attarde et al. | 707/609 |
| 2011/0289281 | A1 * | 11/2011 | Spackman | 711/154 |
| 2011/0307569 | A1 * | 12/2011 | Sacks et al. | 709/206 |
| 2012/0030477 | A1 * | 2/2012 | Lu et al. | 713/189 |

OTHER PUBLICATIONS

Spackman, Stephen P., U.S. Appl. No. 12/815,529, filed Jun. 15, 2010.

* cited by examiner

*Primary Examiner* — Cam-Linh Nguyen
(74) *Attorney, Agent, or Firm* — Roeder & Broder LLP; James P. Broder (57) ABSTRACT

A computer-implemented method for deduplicating an incoming data sequence can include the steps of storing signature values for a plurality of data blocklets of a parent data sequence in a deduplication index, sequentially storing signature values for at least some of the plurality of data blocklets of the parent data sequence in a first storage location outside of the deduplication index, determining that a first data blocklet in the incoming data sequence is absent from the parent data sequence, storing a signature value for the first data blocklet in a second storage location outside of the deduplication index, storing a guarded link linking the first data blocklet to the second data blocklet into the second storage location, determining that a second data blocklet that follows the first data blocklet in the incoming data sequence is present in the parent data sequence, the second data blocklet having a signature value that is stored in the first storage location, and copying at least a portion of the contents of the first storage location and the second storage location into a cache to expedite access during deduplication of the incoming data sequence.

26 Claims, 6 Drawing Sheets

METHOD FOR INCREASING DEDUPLICATION SPEED ON DATA STREAMS FRAGMENTED BY SHUFFLING

BACKGROUND

Data deduplication is a technique used to reduce the overall amount of data storage required to represent and retain data. In general, data deduplication works by identifying duplicate portions of the data being stored and replacing those duplicate portions with pointers to existing stored copies of that data. In this manner, a unique sequence of data identified by a deduplication engine is only required to be stored a single time.

A deduplication index (also sometimes referred to herein as a primary index) in a deduplication engine is a data structure used for storing signature values, such as hash values, that are associated with sequences of data that are being stored. These sequences of data are often small portions of a larger file or a data stream and are referred to as blocklets. Copies of unique blocklets are typically stored in a blockpool which may reside in mass storage such as on hard disk drive or storage area network. A pointer to an address/location in a blockpool can be stored in the primary index to point from the signature of a blocklet to the actual storage location of the data that comprises it.

One of the bottlenecks in bulk data matching tasks, such as data deduplication, is access to the primary index. This bottleneck exists because in many storage technologies, such as disk drives and even solid state storage, random data access is much slower than sequential data access. Because of this slowness, content-driven lookup, such as looking up or searching for a signature of a blocklet in a primary index, can take considerable time, as it is an inherently random process. The slowness of random access is compounded by the fact that primary indices can often be very large.

During deduplication, a signature value, such as a hash value for a blocklet of data being deduplicated, may, initially be looked up in the primary index of a deduplication engine. In some embodiments, the primary index then references a storage location outside of the primary index, but typically still within the deduplication engine, such as a cluster header. This "outside storage location" typically comprises, or is closely related to, a sequential representation of blocklets of a previously duplicated data stream (also sometimes referred to herein as a "data sequence"). After finding an initial blocklet's signature in this sequential representation, a time savings and computational savings is realized if the signature for the next blocklet from the data stream that is currently being deduplicated happens to be a sequential repetition of the previously seen data stream that is represented in the outside storage. An instance where this sequential matching occurs offers time and computational savings by precluding the deduplication engine from expending the time and computational resources required to search for the signature by random access through the primary index. As a fair amount of stored data tends to be data that is repetitive in nature, such use of storage outside the primary index can generate an overall gain in deduplication efficiency.

An incoming data stream can have a different sequence from the previously stored data, even though the content of the data has not changed. Efficient data deduplication under these conditions is extremely challenging. For example, data can be moved or shuffled around, so that one set of previously-seen data has been inserted between two other formerly consecutive sets of previously-seen data. In this example, because the data stream is typically parsed into blocklets in a somewhat random manner which is irrespective of the actual data files in the data stream, one blocklet can consist of the tail end of a first set of data and the front end of the inserted, second set of data. This type of blocklet, which is comprised wholly of previously-seen data, albeit not in the same order, is referred to herein as a transition blocklet since the blocklet covers the transition from the first set of data (e.g., a first data file) to the second set of data (e.g., a second data file). During the deduplication process, this type of transition blocklet is in itself unrecognizable since no signature has previously been assigned to it. Stated another way, these novel transition blocklets are viewed as never-before-seen blocklets. Thus, for each occurrence of a new transition blocklet a random access search in the primary index is required, which expends excessive time and computational resources. Once it has been determined that the transition blocklet has not been previously recognized by the deduplication engine, the transition blocklet is stored in the same manner as a new data blocklet.

Additionally, it is impractical, if not impossible, to predict the signature of the blocklet that immediately follows a transition blocklet just by looking at the transition blocklet. Therefore, in conventional deduplication systems, an additional random access search in the primary index is required. In this example, the search process outlined above typically must be repeated for each successive transition blocklet, as well as (at least) for the blocklet that immediately follows the transition blocklet, again expending excessive time and computational resources.

SUMMARY

In certain embodiments, the present invention is directed toward a computer-implemented method for deduplicating an incoming data sequence. In one embodiment, the method includes the steps of storing signature values for a plurality of data blocklets of a parent data sequence in a deduplication index; sequentially storing signature values for at least some of the plurality of data blocklets of the parent data sequence in a first storage location outside of the deduplication index; determining that a first data blocklet in the incoming data sequence is absent from the parent data sequence; storing a signature value for the first data blocklet in a second storage location outside of the deduplication index; storing a guarded link in the second storage location, the guarded link linking the first data blocklet to the second data blocklet; determining that a second data blocklet that follows the first data blocklet in the incoming data sequence is present in the parent data sequence, the second data blocklet having a signature value that is stored in the first storage location; and copying at least a portion of the contents of the second storage location, including the guarded link, into a cache which expedites access during deduplication of the incoming data sequence.

In one embodiment, the cache is included as part of a computer usable volatile memory. In certain embodiments, the storage location includes a cluster header. In another embodiment, the method also includes the step of storing the first data blocklet into a cluster. In one embodiment, the cluster can be designated to receive only other data blocklets that are determined to be absent from the parent data sequence. Further, in one embodiment, the first data blocklet immediately follows another data blocklet that was found to be present in the parent data sequence. In accordance with another embodiment, the second data blocklet immediately follows the first data blocklet in the incoming data sequence. The second data blocklet can alternatively be spaced apart from the first data blocklet in the incoming data sequence by at least one other data blocklet. In one embodiment, the step of copying includes copying the entire contents of the first and/or second storage location into the cache.

In accordance with another embodiment, the method includes the steps of storing signature values for a plurality of data blocklets of a parent data sequence in a deduplication index; sequentially storing signature values for at least some of the plurality of data blocklets of the parent data sequence in a first storage location outside of the deduplication index; locating a transition data blocklet that is absent from the parent data sequence; sequentially storing a signature value for the transition data blocklet into a second storage location outside the deduplication index; determining that a signature value for a data blocklet that follows the transition data blocklet is included in the storage location; and copying at least a portion of the contents of the first storage location and the second storage location into a cache which expedites access during deduplication of the incoming data sequence.

The present invention is also directed toward a deduplication engine of a computer system. In this embodiment, the deduplication engine utilizes the methods provided above to deduplicate the incoming data sequence.

DESCRIPTION

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "identifying," "determining," "storing," "comparing," "using," "incrementing," "decrementing," "displacing," "deleting," "moving," "updating," "managing," or the like, refer to the actions and processes of an electronic computing device. The electronic computing device manipulates and transforms data represented as physical (electronic) quantities within the electronic computing device's registers and memories and/or hardware into other data similarly represented as physical quantities within the memories, registers and/or hardware. In some embodiments such an electronic computing device is included within, coupled with, or takes the form a computer system, a data storage system, a server, a storage area network, and/or a deduplication engine (or portion thereof), or some combination of the foregoing.

Overview of Discussion

In some implementations of data deduplication it is desirable to move some data that would conventionally be found only in a primary index to alternate storage locations outside of the primary index. Such storage outside a primary index can be referred to by many names. Examples herein describe such storage outside of a primary index as being cluster headers; however, other storage locations with other names can be used in a similar fashion to the described example embodiments.

In one embodiment, the outside storage location includes a sequential representation of blocklets of a previously deduplicated data stream (e.g., a sequence of signatures of the blocklets along with pointers to the stored data of the blocklets). After finding an initial blocklet's signature value, such as a hash value, in this sequential representation, a time savings and computational savings is realized if the signature for the next blocklet from a data stream currently being deduplicated happens to be a sequential repetition of the previously seen data stream that is represented sequentially in the outside storage. As a fair amount of stored data tends to be data that is repetitive in nature, such use of storage outside the primary index can generate an overall gain in deduplication efficiency.

However, data can be moved or shuffled around, so that one set of previously-seen data has been inserted between two other formerly consecutive sets of previously-seen data. Because the data stream is typically parsed into blocklets in a somewhat random manner, a transition blocklet can consist of the tail end of a first set of data and the front end of an inserted, second set of data. The deduplication system described herein decreases the incidence of random searches of the primary index upon location of a transition blocklet in an incoming data stream.

Certain systems and methods are referenced and/or described herein providing ways to create and manage links, such as a link from a parent data stream to a branch data stream. A more comprehensive description of these and additional embodiments is provided in U.S. patent application Ser. No. 12/506,400, entitled "CREATING AND MANAGING LINKS TO DEDUPLICATION INFORMATION", filed on Jul. 21, 2009, and assigned to Quantum Corporation, assignee of the present application. To the extent permitted, the contents of U.S. patent application Ser. No. 12/506,400 are hereby incorporated by reference as though fully set forth herein. Regarding the present invention, certain methods and systems are described herein for decreasing the incidence of searching the primary index, which increases efficiency of the deduplication engine, resulting in an overall time savings and an increase in performance.

Discussion will begin with a description of an example computer system with which, or upon which, various embodiments of the present invention may be implemented. The computer system will be further described with reference to a deduplication management system and its constituent components. The computer system will be further described with reference to portions of an example deduplication engine. Additionally, the computer system will be described in more detail in conjunction with description of various example methods for decreasing the incidence of searching the primary index.

Example Computer System Environment

Figure 1:
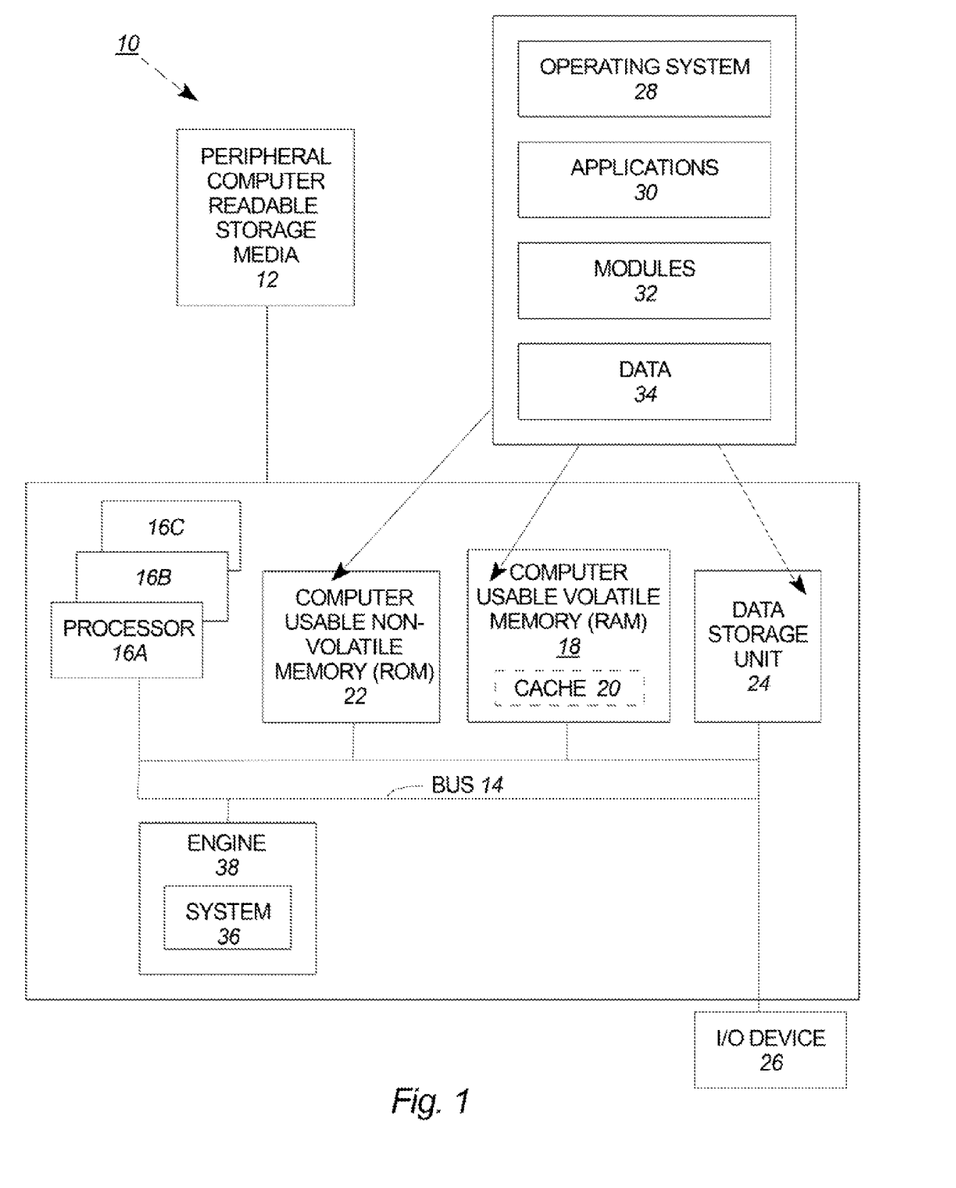
FIG. 1 illustrates one example of a type of computer system that can be used in accordance with the present invention.

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 10) that can be used in accordance with or to implement various embodiments which are discussed herein. It is appreciated that computer system 10 of FIG. 1 is only an example and that embodiments as described herein can operate on or within a number of different computer systems including, but not limited to, general purpose networked computer systems, embedded computer systems, server devices, client devices, various intermediate devices/nodes, stand alone computer systems, storage area networks, and the like. Computer system 10 of FIG. 1 is well adapted to having peripheral computer-readable storage media 12 such as, for example, a digital versatile disk (DVD), a compact disc, a flash memory, and the like, coupled thereto.

Computer system 10 of FIG. 1 includes an address/data bus 14 for communicating information, and one or more processors 16A, 16B, 16C, coupled to bus 14 for processing information and instructions. Processors 16A, 16B, and 16C may be any of various types of microprocessors. Computer system 10 also includes data storage features such as a computer usable volatile memory 18, e.g. random access memory (RAM), which includes a cache 20 that is embedded in the RAM 18. The computer usable volatile memory 18 is coupled to bus 14 for storing information and instructions for processors 16A, 16B, and 16C.

Computer system 10 can also include computer usable non-volatile memory 22, e.g. read only memory (ROM), coupled to bus 14 for storing static information and instructions for processors 16A, 16B, and 16C. In this embodiment, also present or communicatively coupled with computer system 10 is a data storage unit 24 (e.g., a magnetic or optical disk and disk drive, a solid state storage, a distributed storage cloud, a federated storage subsystem, and/or a storage area network, among others) coupled to bus 14 for storing information and instructions. Computer system 10 also includes an I/O device 26 for coupling computer system 10 with external entities. For example, in one embodiment, I/O device 26 is a modem for enabling wired or wireless communications between computer system 10 and an external network such as, but not limited to, the Internet. In another embodiment, connection to the Internet is accomplished directly, e.g., the computer system 10 includes an NIC which is wired (directly or indirectly) to a router.

In the embodiment illustrated in FIG. 1, the computer system 10 includes an operating system 28, one or more applications 30, one or more modules 32, and data 34, which are shown as typically residing in one or some combination of computer usable volatile memory 18 (e.g., RAM) which can include the cache 20, computer usable non-volatile memory 22 (e.g., ROM), and data storage unit 24. As provided herein, the cache 20 that is embedded within the RAM 18 can be a software entity that selectively stores part of the data 34 according to various policies set forth herein.

In some embodiments, all or portions of various embodiments described herein can be stored, for example, as an application 30 and/or module 32 in memory locations within RAM 18, computer-readable storage media within data storage unit 24, peripheral computer-readable storage media 12, and/or other tangible computer readable storage media. Additionally, computer system 10 further includes a deduplication management system 36 (sometimes referred to herein as a "management system") and a deduplication engine 38.

Computer system 10 can also include an optional alphanumeric input device (not shown) including alphanumeric and function keys coupled to bus 14 for communicating information and command selections to processor 16A or processors 16A, 16B, and 16C. System 10 can also include an optional cursor control device (not shown) coupled to bus 14 for communicating user input information and command selections to processor 16A or processors 16A, 16B, and 16C. In one embodiment, system 10 can also include an optional display device (not shown) coupled to bus 14 for displaying information.

Example Deduplication Management System

Figure 2:
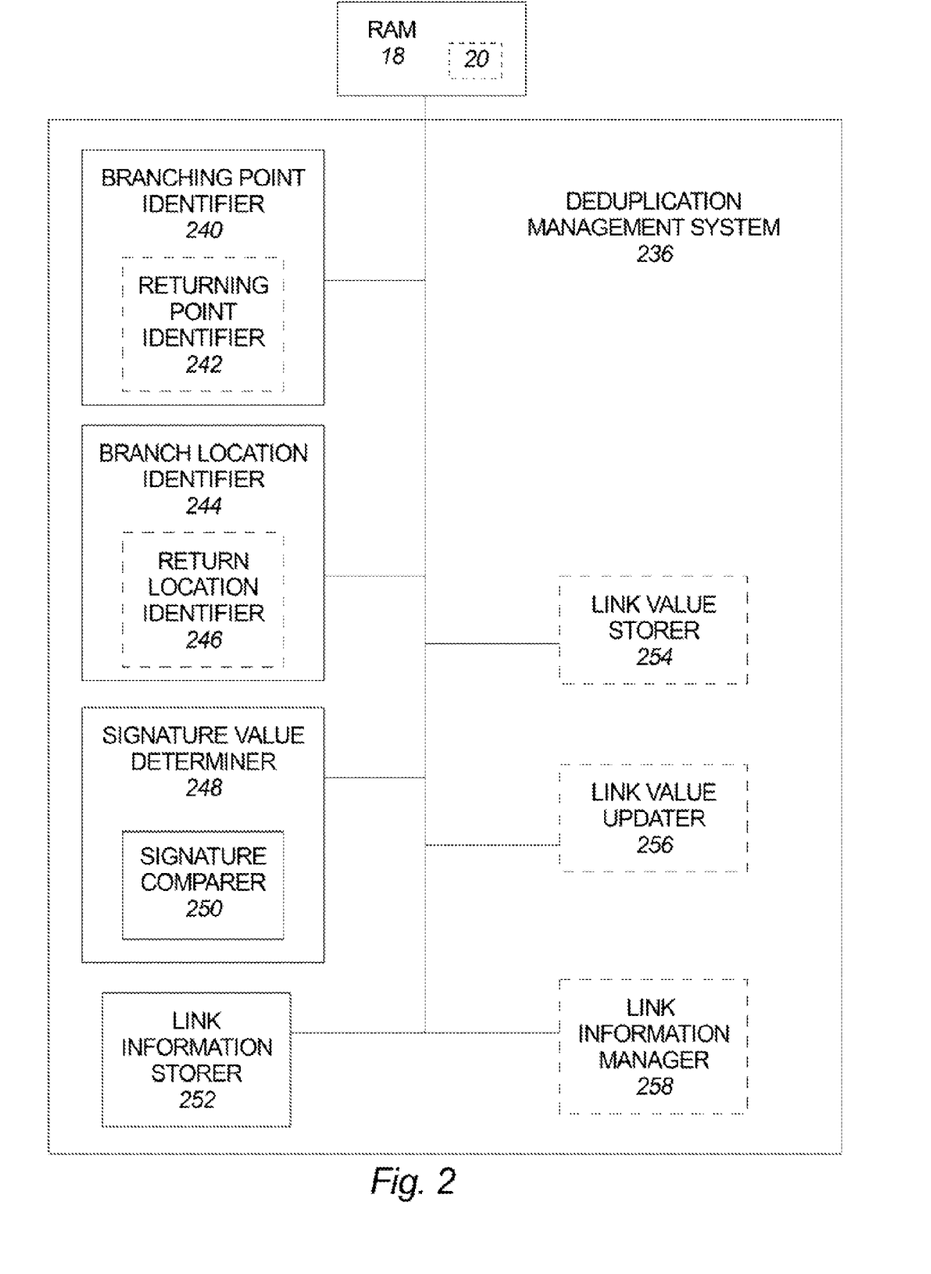
FIG. 2 is a block diagram of one embodiment of the deduplication management system having features of the present invention.

FIG. 2 is a block diagram of one embodiment of the deduplication management system 236 (also referred to herein as "management system") that can be utilized in conjunction with the present invention. The specific type of management system 236 that can be utilized herein can vary, and need not include all of the components illustrated and/or described relative to FIG. 2. Alternatively, the management system 236 can include additional features that are not specifically identified herein. In the embodiment illustrated in FIG. 2, the management system 236 can include a branching point identifier 240, a branch location identifier 244, a signature value determiner 248, and a signature comparer 250. In one embodiment, branching point identifier 240 further includes or performs the functions of returning point identifier 242. In one embodiment, the management system 236 includes a return location identifier 246. In one embodiment, branch location identifier 244 includes or performs the functions of return location identifier 246. In one embodiment where links are to be managed as well as created and followed, the management system 236 further includes link value storer 254, link value updater 256 and link information manager 258. All of these portions of the management system 236 can be communicatively coupled to one another, such as via a common bus, as required to perform link creation and management. In various embodiments, these described portions of management system 236 are implemented as hardware, a combination of hardware and firmware, and/or a combination of hardware and software (e.g. computer implemented instructions to be implemented by processor 16A of computer system 10 shown in FIG. 1).

It is appreciated that, in one embodiment, the management system 236 is coupled with or a part of a computer system, such as computer system 10 (described previously relative to FIG. 1). In one embodiment, this includes a communicative coupling to a computer usable volatile memory 18, such as RAM, in which information can be stored, accessed, and/or managed. In various embodiments, cache 20 can selectively store certain portions of data 34 (illustrated in FIG. 1) according to various deduplication policies which are described in greater detail herein. Thus, under certain circumstances, a random search of the primary index can be avoided, resulting in an overall time savings and/or an increase in performance.

As illustrated in FIG. 2, in one embodiment, branching point identifier 240 can operate to identify a branching point where a branch data sequence diverges from a parent data sequence that has been previously stored in a data deduplication process. The branching point is a point, such as an address, located with respect to the previously stored parent data sequence or representation thereof (e.g., a sequence of the signature values of consecutive blocklets of the parent data sequence). Consider as but one example, a parent data sequence that represents a file that has been stored and then deduplicated. In one embodiment, a branch data sequence that branches from this parent data sequence may then represent a modified portion of a late modified (and then stored) version of the same file. Consider a very simplified example in which a parent data sequence is represented by the sequence: A, B, C, D, and a modified data sequence is represented by the sequence A, B, R, S, T, C, D. In the modified data sequence, the modified portion R, S, T branches away after the initial portion A, B, and returns to the parent data sequence to finish out with C, D. When deduplication is performed on the data of this later modified file, the data of the later modified file follows the parent data sequence until the point where the modification occurred (the branching point in this example), after which the data of the later modified file diverges from the parent data sequence. In some embodiments, branching point identifier 240 can similarly be used to identify a branching point within a branch data sequence to a second branch data sequence (and so on).

Returning point identifier 242 identifies a returning point where the branch data sequence returns to the parent data sequence. The returning point is a point, such as an address, located with respect to a previously stored branch data sequence on representation thereof. At this returning point the branch data sequence branches back or returns to the parent data sequence.

Branch location identifier 244 operates to identify a branch location where the information of a branch data sequence begins. In one embodiment, the branch location comprises a place, such as an address where the information of the branch data sequence begins. In some embodiments branch location identifier 244 searches for the branch location or notes its location when it is initially stored. In other embodiments, branch location identifier 244 receives the branch location from some portion of a deduplication engine (e.g., deduplication engine 38 of FIG. 1) that searches for and finds the branch location.

Return location identifier 246 identifies a return location in the parent data sequence. The return location is a place, such as an address in the parent data sequence where the branch data sequence returns from the returning point (in the branch data sequence) to resume or pick up again in the parent data sequence. As both branching and returning are data dependent phenomena, it is appreciated that in some embodiments and on certain occasions, a branch data sequence may not return or revert back to the parent data sequence. In some embodiments return location identifier 246 searches for the branch location or notes its location when it is initially stored. In other embodiments return location identifier 246 receives the branch location from some portion of a deduplication engine (e.g., deduplication engine 38 of FIG. 1) that searches for and finds the return location.

Signature value determiner 248 determines a signature value, such as a hash value, that is associated with a subsequence of the information represented in a branch data sequence. It is appreciated that in some embodiments, the signature value can comprise something other than or in addition to a hash value that provides a summary or characterization of a range of information (e.g., the head subsequence of the branch data sequence) against which a comparison can be made. The signature value may be for a "head" region/subsequence of the information of the branch data sequence. The head subsequence may be a single initial blocklet of branch data sequence, a portion of the initial blocklet, or some portion or portions of one or more of the first several blocklets of the branch data sequence. In one embodiment, signature value determiner 248 determines a signature value, such as a hash value that is associated with a resuming blocklet or range of information represented at a return location in a parent data sequence. In one embodiment, the determining comprises generating the signature value, such as hashing on a blocklet or blocklets or a portion of a blocklet/blocklets to generate a hash value.

In one embodiment, the determining comprises referencing a stored signature value of a blocklet, such as a hash value or other identifying information stored at an address of a branch location or a return location. In one embodiment, signature values for blocklets may be available from another location as a side effect of processing blocklets for deduplication. In one embodiment where signature values are available from another location, signature value determiner 248 determines a signature value by acquiring the existing signature value from this other location. In one embodiment, where signature values are available from another location, all or part of the functions of signature value determiner 248 may be performed by an existing portion of deduplication engine 38 (illustrated in FIG. 1).

In a similar manner, signature value determiner 248 can, in one embodiment, determine a signature value associated with a "tail" or end region/subsequences of a branch data sequence. This tail may comprise the final blocklet, final several blocklets, or portion/portions of the final blocklet and/or final several blocklets of the branch data sequence. Although the description herein utilizes examples that concentrate on matching information to a portion of a signature value associated with a head of a branch data sequence, it is appreciated that in various embodiments, matching can be performed in a similar fashion to a portion of a signature value that is associated with the tail of a branch data sequence. Because processing of a data sequence does not have to be performed perfectly sequentially and because there is typically a large amount of buffer memory available in a broader system in which deduplication is performed, matching to a signature value of a tail of a branch data sequence can be performed instead of (or in addition to) matching to a portion of a signature value associated with a head of a branch data sequence.

Signature comparer 250 compares a signature value (or portion thereof) with another signature value (or portion thereof) to determine if they match or do not match. For example, in one embodiment, this can comprise comparing a first hash value with a second hash value. In another embodiment, this can comprise comparing a portion of a first hash value (such as the first 6 bytes of a 16-byte hash value which may have been stored) with an equivalent portion of a second hash value. Although shown as a portion of link signature value determiner 248, it is appreciated that signature comparer 250 may be implemented apart from signature value determiner 248.

Link information storer 252 stores link information in a computer memory, such as RAM 18. This link information may also be stored in a mass storage, such as on a hard disk drive or other mass storage. In one embodiment, the link information is stored in a storage location, such as a cluster header, for a cluster that holds the parent data sequence. In one embodiment, the link information comprises a link to the previously described branch location and also comprises a portion of a signature value of a head of the information represented at the branch location. The portion of the signature value may be all of the signature value or some subset, such as the first 12 bytes of a 16-byte hash value, some combination of bytes of a hash value and other summarizing/characterizing information, or some subset of summarizing or characterizing information regarding the head of a branch data sequence.

Link value storer 254 stores an initial value as a link value associated with an item of link information. In one embodiment, link value storer 254 stores this link value when the item of link information with which it is associated is initially stored. This link value provides a usefulness ranking for the stored item link information. In one embodiment, the higher the link value, the more useful that item of link information is deemed to be.

Link value updater 256 updates a stored link value over time based upon usefulness of the link information with which the link value is associated. In one embodiment, link value updater 256 updates the link value over time, such as by incrementing the link value associated with an item of link information each time that the link information is successfully employed to link to a branch data sequence and/or decrementing the link value over time as it ages with non-use or does not succeed in providing a link to a branch data sequence.

Link information manager 258 uses the link value to inform competitively managed retention of a plurality of link information stored in the computer memory. For example, in a memory or storage of a fixed size (e.g., a cluster header) there may only be room to store a limited amount of link information. In one embodiment, when there is not sufficient room to add a new item of link information, link information manager 258 compares the link values of the currently stored items of link information. In one embodiment, an item of link information that has the lowest link value is removed to make room for a new item of link information. In one embodiment, in the case of a tie for the lowest link value, link information manager 258 employs a tie breaking procedure. For example, in one embodiment, link information manager 258 removes the oldest item of link information from among the items of link information that are tied for the lowest link value.

Example Deduplication Engine

Figure 3:
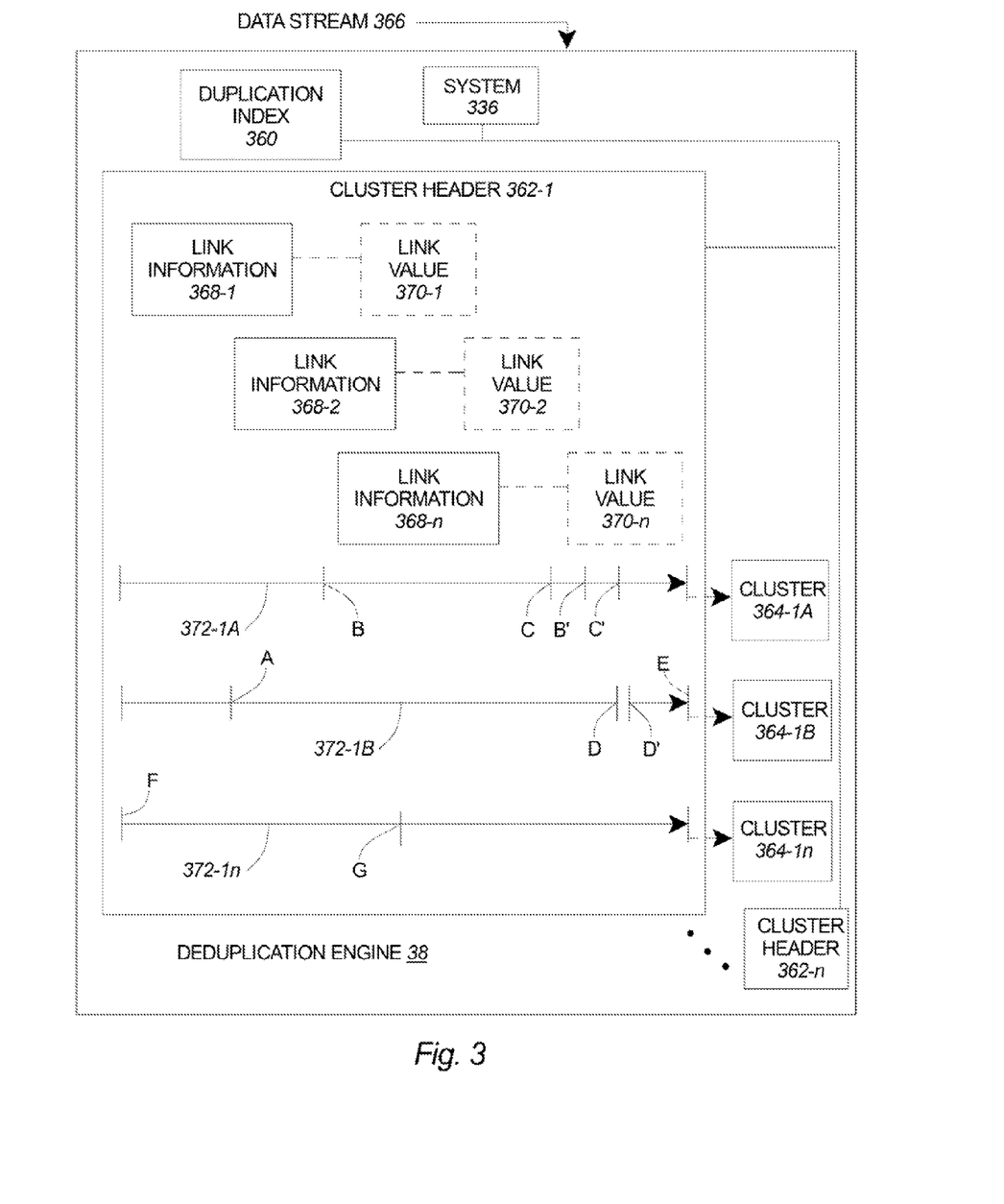
FIG. 3 is a block diagram of a portion of one embodiment of an example deduplication engine having features of the present invention.

FIG. 3 is a block diagram of a portion of one embodiment of an example deduplication engine 38. It is appreciated that FIG. 3 is a high level block diagram and many portions of deduplication engine 38 are either omitted or not described in detail so as not to obscure aspects of embodiments of the present invention. In one embodiment, deduplication engine 38 includes a deduplication index 360 (e.g., a primary index), a plurality of cluster headers 362-1 to 362-n (generically referred to herein as cluster header 362), and management system 336, all of which are communicatively coupled with one another. As shown in FIG. 3, cluster header 362 is associated with and serves as a header for a plurality of clusters 364 (e.g., cluster header 362-1 is associated with and serves as a header for clusters 364-1A, 364-1B . . . 364-1n). It is appreciated that a cluster 364 may also or alternatively be referred to as a cluster body. A cluster represents a storage area where a representation of deduplicated data is/was sequentially stored after being deduplicated from a data stream 366 (this may include actual data and pointers). Cluster header 362 includes a variety of information about the clusters 364 with which the cluster header 362 is associated.

For example, as shown in FIG. 3, in one embodiment, cluster header 362-1 includes a plurality of link information 368 (e.g., link information 368-1, 368-2 . . . 368-n). In one embodiment, each item of link information 368 also includes an associated link value 370 that provides a valuation (e.g. a numerical value) that assesses the overall usefulness of the link information 368 with which the link value 370 is associated. In the embodiment illustrated in FIG. 3, for example, link value 370-1 is associated with link information 368-1, link value 370-2 is associated with link information 368-2, and link value 370-n is associated with link information 368-n. In one embodiment, the management system 36 is utilized to manage which link information is kept in cluster header 362-1 and which is removed or moved to another location outside of cluster header 362-1.

It is appreciated that cluster header 362-1 and its associated clusters may reside in mass storage, such as on a hard disk drive or another suitable type of media. As set forth herein, under certain circumstances, one or more cluster headers 362 are retrieved from mass storage and selectively moved and/or copied directly to the cache 20 for quicker access when a blocklet of data from data stream 366 is identified as having a signature for a blocklet that is stored in one of the clusters 364 that is associated with the corresponding cluster header 362, or according to other policies as described herein. It is appreciated that, when used in this fashion, cluster headers 362 represent an extra level of indirection between deduplication index 360 and the actual storage location of the information of a deduplicated blocklet of data, which can expedite the deduplication process as provided herein.

In one embodiment, stored sequences 372 (e.g., 372-1A, 372-1B . . . 372-1n) are part of a cluster header 362-1, and each stored sequence (e.g. 372-1A) represents the sequentially stored signature values of the actual data blocklets which are stored/represented in an associated cluster 364-1A, 364-1B, 364-1n, that typically resides in mass storage (e.g., on a hard disk drive). For example, stored sequence 372-1A is associated with cluster 364-1A, stored sequence 372-1B is associated with cluster 364-1B, and stored sequence 372-1n is associated with cluster 364-1n. The signature values, such as hash values, are signatures of blocklets of a data stream 366. In one embodiment, these signature values are stored in sequence in the stored sequences 372, with each signature value being stored in association with a pointer to the actual location of the information of the blocklet in a cluster 364 (the actual location is typically an address in mass storage such as on a disk or in a storage area network). Such sequential storage of signature values in a particular stored sequence 372 continues until an associated cluster 364 is filled. In one embodiment, the sequential storage then continues in another stored sequence 372 that is associated with another cluster 364. Although stored sequences 372-1A, 372-1B, and 372-1n are shown as separate entities, it is appreciated that a cluster header 362 may comprise one long stored sequence that is associated with a plurality of clusters 364 (e.g. 364-1A, 364-1B, and 364-1n).

Apart from the language used herein, it is appreciated that "pointers" to the actual data from a stored sequence 372 can be other kinds of identifiers, in some embodiments. For example, the embodiments described herein would also be applicable in a massive distributed storage system where the hash value themselves might be used to locate the data and the sequence data of the stored sequences 372 may be the copy of the sequence used to identify actual file contents.

Because signature values for blocklets of a previously deduplicated data stream are stored sequentially in a stored sequence 372, once a signature value for a blocklet in an incoming data stream 366 (also sometimes referred to herein as a follow-on data stream) is identified in a stored sequence 372 as matching a signature value from a previously deduplicated data stream, it is computationally efficient to compare the signature value of the next blocklet to the stored signature value of the next sequentially stored signature value that is stored in the stored sequences 372 of a cluster 364. This is much faster than performing a random search across the deduplication index 360 in an attempt to locate this next signature value. In such an embodiment, a portion of the stored sequence 372 of the cluster 364 represents a parent data sequence that blocklets of a follow-on data stream 366 are being matched against during deduplication. This sequential matching against the parent data sequence can continue until the data sequence of the currently being deduplicated data stream 366 deviates from the previously deduplicated parent data sequence. As previously described, in one embodiment, this new information which deviates from the previous data stream can be referred to herein as a branch data stream or a branch data sequence. In an alternative embodiment, the processing described above need not be in a sequential manner.

With reference to FIG. 3, in one non-exclusive example, a parent data stream is represented as the stored sequence 372-1A of cluster 364-1A. While data stream 366 is being deduplicated by deduplication engine 38, sequential blocklets of information match those of stored sequence 372-1B until branching point "A" is reached. Through searching of stored sequences 372-1A through 372-1n or via other mechanisms such as searching of deduplication index 360, it is determined that a branch data sequence begins at location "B" in stored sequence 372-1A. In one embodiment, branching point identifier 240 identifies point "A" as a branching point in the parent data sequence represented by stored sequence 372-1B, branch location identifier 244 identifies location "B" as the starting point of a branch data sequence that branches from branching point A, and signature value determiner 248 determines a signature value (e.g., a hash value) associated with the first blocklet (or in other embodiments the second blocklet, or some combination or subset of the first several blocklets or portions thereof) of the branch data stream starting at branch location B. Link information storer 252 then stores link information 368-1 in cluster header 362-1, so that on a subsequent deduplication pass along the parent data sequence, represented by a portion of the stored sequence 372-1B, there will be a link from the address of point A to the address of location B.

In one embodiment, link information storer 252 also stores in link information 368-1 a portion of the signature value of the head of a branch data sequence that begins at location B. For example, in one embodiment, this can comprise storing a portion of the hash value of the initial blocklet of the sequence that begins at location B. The portion of the signature value that is stored in the link information can vary from one bit of the signature value to the entirety of the signature value, with more bits/bytes being used to ensure a higher likelihood of the link being valid. In one embodiment, link value storer 254 also stores a threshold initial value as link value 370-1. This threshold initial value can be a default value or an initial estimate of the link value based upon information then available to the system, such as the lengths of the subsequences under consideration and/or the methods by which their constituent blocks were located.

Following this same example, on a subsequent pass along the parent data stream, if a divergence occurs at point A, deduplication engine 38 can search cluster header 362-1 for link information associated with point A. To determine if link information 368-1 from point A to location B should be followed, signature comparer 250 compares a signature value for the next blocklet (the divergent blocklet) with the portion of a signature value that is stored with link information 368-1. If there is a match, then there is a high confidence that this will be a successful link and deduplication engine 38 checks location B to see if the branch data sequence continues at the address of location B. In other embodiments, instead of making the comparison to the next blocklet, signature comparer 250 compares a signature value for the second blocklet following the divergence, or some combination or subset of the first several blocklets or portions thereof following the divergence.

In one embodiment, if the link information 368-1 is used to successfully link to location B, link value updater 256 increments link value 370-1 by some amount to increase the link value 370-1 associated with link information 368-1. In one embodiment, if link information 368-1 is not successfully employed to link to location B, link value updater 256 decrements link value 370-1 by some amount to decrease link value 370-1. In one embodiment, as time passes without use of link information 368-1, link value updater 256 decrements or decays link value 370-1 to indicate a decreased value with age and non-use. This decay can be a fixed amount per unit of time or can be an increased decay as more time passes (e.g., a linear increase in decay with time with non-use or an exponential increase in decay with increased time of non-use).

In another embodiment the physical update of the link value and the logical update of the link value are decoupled. Consider, as an example, a decoupled embodiment where a value and a time of last update are both stored, the value is decremented (or decayed) according to the time of last update. In one such decoupled embodiment, the physical decrementing is applied to the link value when a write to the data structure is otherwise motivated. The decrementing of the link value may also be randomized, approximated, and/or estimated in order to save space and/or time, in some embodiments, when precision is not a controlling or over important requirement. For example, when space is short (e.g., saving space is a more important consideration than having very accurate link values) very small counters that go up and down may be used. These very small counters are physically altered on randomized occasions such that the link values of these counters move up and down between integer quantities with probabilities depending on the true, possibly factional, value of the computed adjustment at that time.

In the event there is no match or if after checking at location B the branch sequence does not continue, a spectrum of options are available before reverting to randomly searching deduplication index 360 for the signature value associated with the divergent blocklet. In one embodiment, for example, other stored sequences 372 of cluster header 362-1 are searched. In one embodiment, other link information 368 stored in RAM 18 or other readily accessible memory is searched. In one embodiment, if stored sequences 372 of other cluster headers (e.g. cluster header 362-*n*) are loaded into RAM 18 or other readily accessibly memory, they and their associated stored sequences 372 are searched for the signature value of the divergent blocklet. One or more of such a spectrum of options may be employed before reverting to deduplication index 360.

Figure 4A:
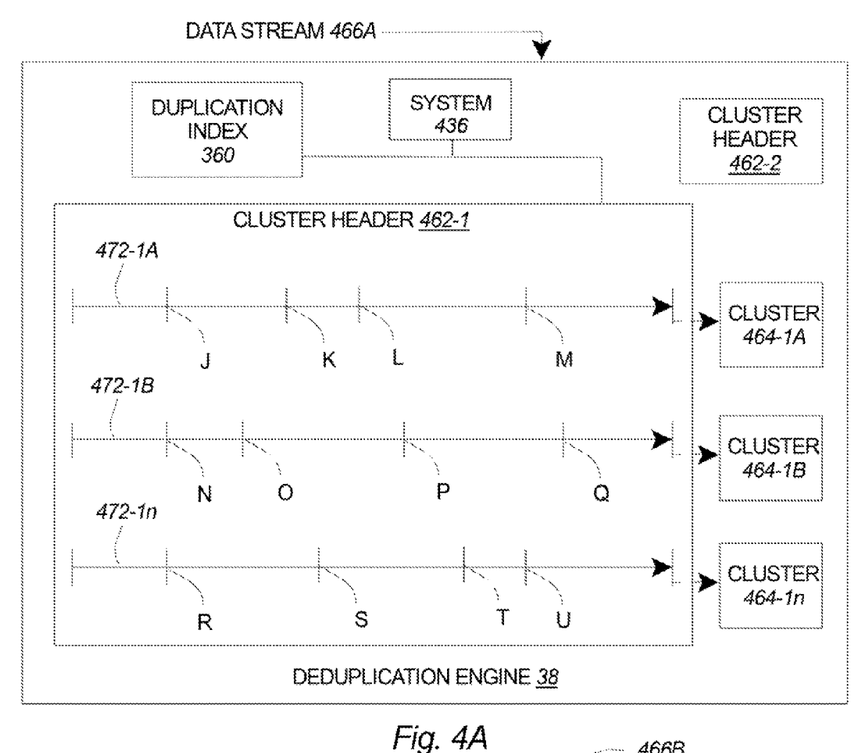
FIG. 4A is a block diagram of a portion of another embodiment of the deduplication engine and an incoming data stream, illustrating how the present invention operates under certain circumstances during the deduplication process.
Figure 4B:
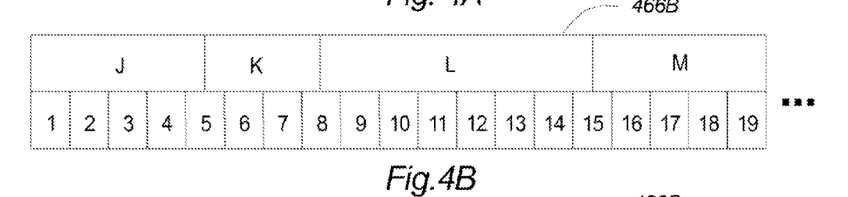
FIG. 4B illustrates a simplified portion of a representative parent data sequence which has previously been deduplicated, including a plurality of data files.
Figure 4C:
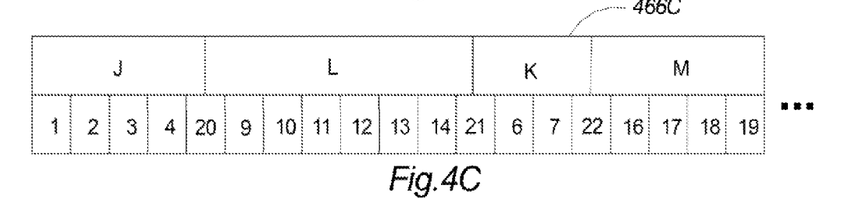
FIG. 4C illustrates a simplified portion of a representative follow-on data sequence to be deduplicated by the deduplication engine illustrated in FIG. 4A, including the data files illustrated in FIG. 4B that have been shuffled.

FIGS. 4A-4C illustrate one embodiment of how the present invention operates under certain circumstances during the deduplication process. The deduplication engine 38 in FIG. 4A is illustrated somewhat similarly and can operate in a somewhat similar manner as the deduplication engine illustrated and described relative to FIG. 3. In FIG. 4A, various elements have either been omitted or not described in detail so as not to obscure aspects of certain embodiments of the present invention. In addition, or alternative to the deduplication capabilities described relative to FIG. 3, the embodiment described relative to FIGS. 4A-4C contemplates a somewhat different scenario than that described previously herein. More specifically, a follow-on data stream 466C (illustrated in FIG. 4C) to be deduplicated can include all of the same data which has previously been stored, however the data has been shuffled or re-ordered from its original sequence. In other words, portions of the data from the follow-on data stream 466C have been shifted around such that the data is in a different sequence from the parent data sequence 466A (illustrated in FIG. 4A). Therefore, although the data files have been previously seen, some of the blocklets comprising those data files have never been seen before by the deduplication engine 38, despite containing no new content, as described in greater detail below.

In the embodiment illustrated in FIG. 4A, the deduplication engine 38 includes the deduplication index 360 (e.g., a primary index), a plurality of cluster headers (one detailed cluster header 462-1 and one simplified, representative cluster header 462-2 are illustrated in FIG. 4A), and the management system 436, all of which are communicatively coupled with one another. As shown in FIG. 4A, cluster header 462-1 is associated with and serves as a header for one or more clusters 464-1A, 464-1B, 464-1*n*. In one embodiment, stored sequences 472-1A, 472-1B, 472-1*n* are part of the cluster header 462-1, and each stored sequence 472-1A, 472-1B, 472-1*n* represents the sequentially stored signature values of the actual data blocklets which are stored/represented in associated clusters 464-1A, etc., that typically reside in mass storage. For example, stored sequence 472-1A relating to data files J, K, L, M, is associated with cluster 464-1A; stored sequence 472-1B relating to data files N, O, P, Q, is associated with cluster 464-1B; and stored sequence 472-1*n* relating to data files R, S, T, U, is associated with cluster 464-1*n*. It is understood that although three stored sequences 472-1A, 472-1B, 472-1*n* are illustrated in the example cluster header 462-1 in FIG. 4A, any suitable number of stored sequences can be included in any given cluster header.

FIG. 4B illustrates a portion of the parent data sequence 466A (illustrated in FIG. 4A; the portion of which is illustrated as 466B in FIG. 4B) which has previously been deduplicated and stored in mass storage. In this example, the portion of the data stream 466B in FIG. 4B includes data files J, K, L, M, which is comprised of blocklets 1-19. As illustrated in FIG. 4B, data file J includes blocklets 1-4 and a front portion of blocklet 5; data file K includes a back portion of blocklet 5, blocklets 6-7 and a front portion of blocklet 8; data file L includes a back portion of blocklet 8, blocklets 9-14 and a front portion of blocklet 15; and data file M includes a back portion of blocklet 15 and blocklets 16-19. Stated another way, blocklet 5 includes an end portion of data file J and a beginning portion of data file K; blocklet 8 include an end portion of data file K and a beginning portion of data file L; and blocklet 15 includes an end portion of data file L and a beginning portion of data file M. As used herein, blocklets which are spread over two different data files, such as blocklets 5, 8 and 15, are sometimes referred to herein as transition blocklets since they form a transition from one data file to another. In this example, any or all of blocklets 1-19 would be recognized in any follow-on data stream, and could be readily deduplicated using the one or more of the methods previously described herein.

FIG. 4C illustrates a portion of an exemplar follow-on data stream 466C of parent data stream 466B to be deduplicated, which is somewhat different than the portion of the parent data stream 466B illustrated in FIG. 4B. As shown in FIG. 4C, the data stream 466C includes the same data files J, K, L, M. However, these data files have been shuffled and appear in a different order (J, L, K, M) in the data stream 466C than the original parent data stream 466B. Additionally, the sequence of blocklets that comprise data files J, L, K, M, has not only been re-ordered, but as a consequence, new, never-before-seen transition blocklets 20, 21, 22, have been generated, and original blocklets 5, 8 and 15 are absent from the follow-on data stream 466C. In this example, data file J now includes blocklets 1-4 and a front portion of blocklet 20; data file L includes a back portion of blocklet 20, blocklets 9-14 and a front portion of blocklet 21; data file K includes a back portion of blocklet 21, blocklets 6-7 and a front portion of blocklet 22; and data file M includes a back portion of blocklet 22 and blocklets 16-19. Stated another way, blocklet 20 includes an end portion of data file J and a beginning portion of data file L; blocklet 21 include an end portion of data file L and a beginning portion of data file K; and blocklet 22 includes an end portion of data file K and a beginning portion of data file M. It is recognized that the data patterns illustrated in FIGS. 4A-4C represent only a fraction of the data that can be analyzed and deduplicated according to the system and methods provided herein.

In the embodiment illustrated in FIG. 4C, deduplication of data file J (blocklets 1-4) from the follow-on data stream 466C can occur as previously described herein because these identical blocklets 1-4 are recognizable to the deduplication engine 38 as being associated with stored sequence 472-1A in cluster header 462-1 (illustrated in FIG. 4A). Once transition blocklet 20, which has never been seen before, is read, one scenario is that a random search of the deduplication index 360 is required. Because transition blocklet 20 will be found to be unrecognized by the deduplication engine 38, this transition blocklet 20 is treated as novel, and can be stored in accordance with the policies for storing novel blocklets as provided herein and/or as previously known or understood in the art. Upon reading the next blocklet (blocklet 9) in the follow-on data stream 466C, a search is performed until the deduplication engine 38 recognizes blocklet 9 as one that has been previously seen before. Thus, in this embodiment, in the course of deduplicating the follow-on data stream 466C, a single non-deduplicable transition blocklet 20 appears between two blocklets (in this case, blocklets 4 and 9), or series of blocklets that are deduplicable.

In certain embodiments, transition blocklet 20 can be stored in a specialized cluster header, such as cluster header 462-2 (illustrated in FIG. 4A), which is adapted to at least store transition blocklets. Alternatively, the transition blocklets can be stored in more than one cluster header. In one embodiment, the specialized cluster header 462-2 stores only transition blocklets. In other words, cluster header 462-2 can be reserved for storing only transition blocklets, i.e. 20, 21, 22, etc. Additionally, a link can be stored in cluster header 462-1, which links or otherwise relates the cluster header 462-1 of blocklet 4 to the cluster header 462-2 of blocklet 20. Somewhat similarly, in the example illustrated in FIG. 4C, additional links can be stored in cluster header 462-1, which link or otherwise relate the cluster header 462-1 of blocklet 14 to the cluster header 462-2 of blocklet 21, the cluster header 462-1 of blocklet 7 to the cluster header 462-2 of blocklet 22, as well as the cluster header 462-2 of blocklet 20 to the cluster header 462-1 of blocklet 9, the cluster header 462-2 of blocklet 21 to the cluster header 462-1 of blocklet 6, and the cluster header 462-2 of blocklet 22 to the cluster header 462-1 of blocklet 16.

Stated another way, in this embodiment, each blocklet immediately preceding a transition blocklet 20, 21, 22 is linked to the cluster header 462-2 of such transition blocklet 20, 21, 22, and each transition blocklet 20, 21, 22 is linked to the cluster header 462-1 of the blocklet immediately following such transition blocklet 20, 21, 22. In one embodiment, each of these links can be associated with a guard. For example, actual hash codes of the data at the far end of the link, either in full, or in reduced form (such as a short, perhaps 16 or 32 bit extract of the hash code), or in a programmable filter, or a probabilistic filter such as a Bloom filter, are used. These filters or guards are associated with the links, and the link is followed only if a short lookahead (such as, in one embodiment, to the immediately following hash code) matches it. With this design, the linking can proceed with relatively low risk. In one embodiment, the links that point to the specialized cluster header 462-2 containing the transition blocklets 20, 21, 22, are specially marked so that it is evident that a transition blocklet is imminent as the end of the already-matched sequence, i.e. blocklets 1-4, 9-14 or 6-7 in FIG. 4C, is being reached, and prior to the specialized cluster header 462-2 ever being loaded into the cache.

At the next encounter of blocklets 1-4, followed by blocklet 20, one of the benefits of the present invention becomes evident. The deduplication engine 38 will operate as previously described and the specialized cluster header 462-2 transition blocklets (including blocklet 20) is then loaded into the cache. Included in cluster header 462-2 is not only the data needed to deduplicate blocklet 20, but also guarded links to data files L, K and M. As soon as the deduplication engine reads blocklets 9, 6 or 16, the cluster header 462-1 that includes those blocklets is loaded into cache as well. In one scenario, because cluster header 462-1 has already been loaded into cache as a result of blocklets 1-4 being read, and cluster header 462-2 has been loaded as a result of blocklet 20 being read, all of the necessary cluster headers for deduplicating follow-on data stream 466C are in a more accessible and convenient location, which increases deduplication speed and efficiency.

In certain embodiments, the deduplication engine 38 can keep track of links that are marked as being transition-related, i.e. blocklet 4 to blocklet 20, blocklet 14 to blocklet 21, etc. In one embodiment, if a predetermined number of transition-related links are recognized by the deduplication engine 38 as pointing to the same specialized cluster header (such as 462-2), then the deduplication engine can load that cluster header 462-2 into the cache for more efficient access during deduplication. Once that cluster header 462-2 is loaded, all of the blocklets to which it refers become available on a substantially risk-free basis because the links out of the specialized cluster header 462-2 are guarded. In one such embodiment, once a plurality of transition-related links are recognized by the deduplication engine 38 as pointing to the same specialized cluster header (such as 462-2), the deduplication engine can load that cluster header 462-2 into the cache for more efficient access during deduplication. The predetermined number of transition-related links can equal any suitable number greater than zero, although the risk is decreased as the predetermined number increases. With this design, a cluster header that is pointed to from a specialized cluster header will likely result in faster and more efficient deduplication of the follow-on data stream.

Stated another way, the first pass of reading data gathers a baseline, the second pass learns a fragmented pattern, and a third pass (and subsequent passes) capitalize on the learning by the deduplication engine 38.

Example Methods of Operation

Figure 5:
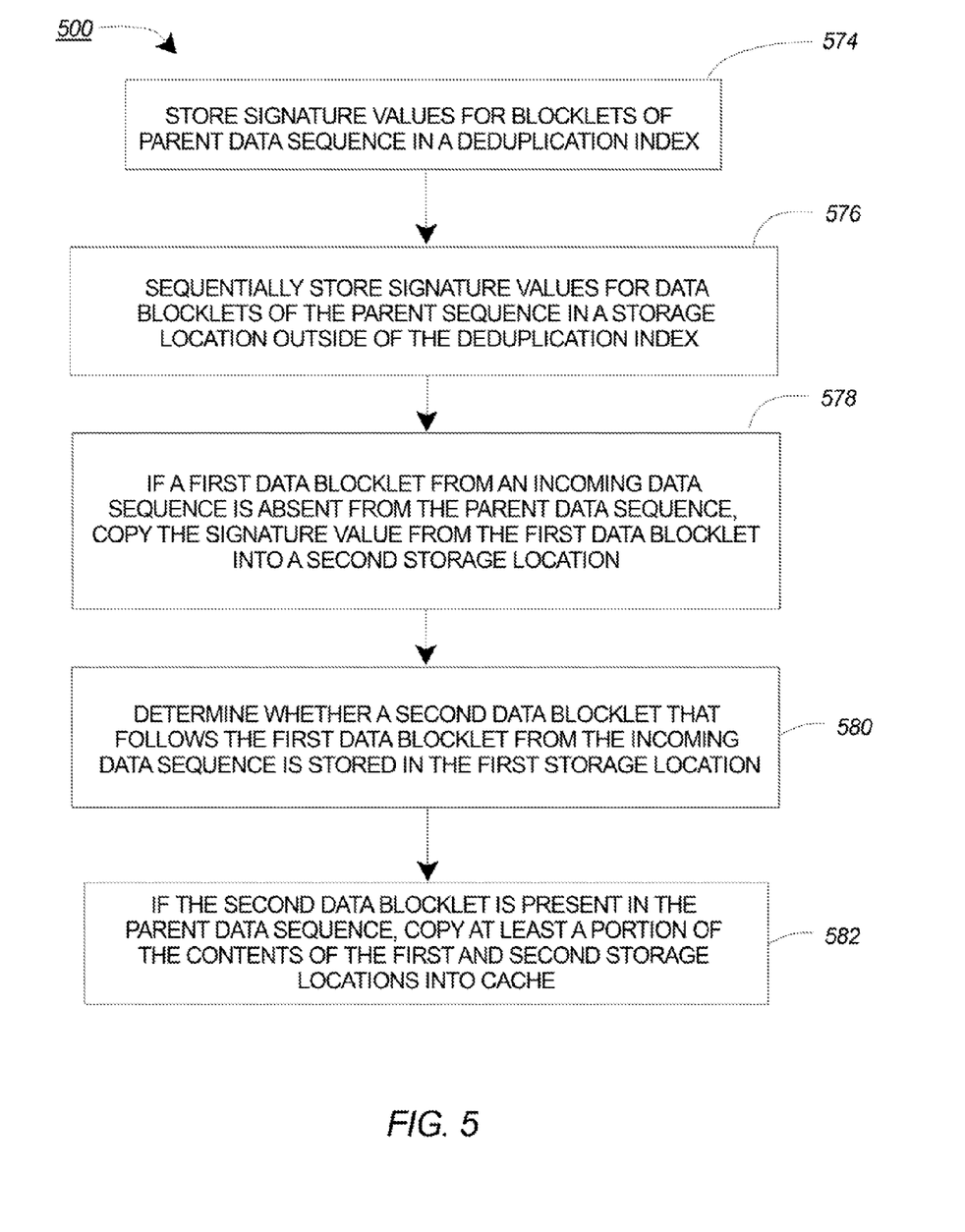
FIG. 5 is a flow diagram illustrating one embodiment of a method for increasing the speed of deduplication.
Figure 6:
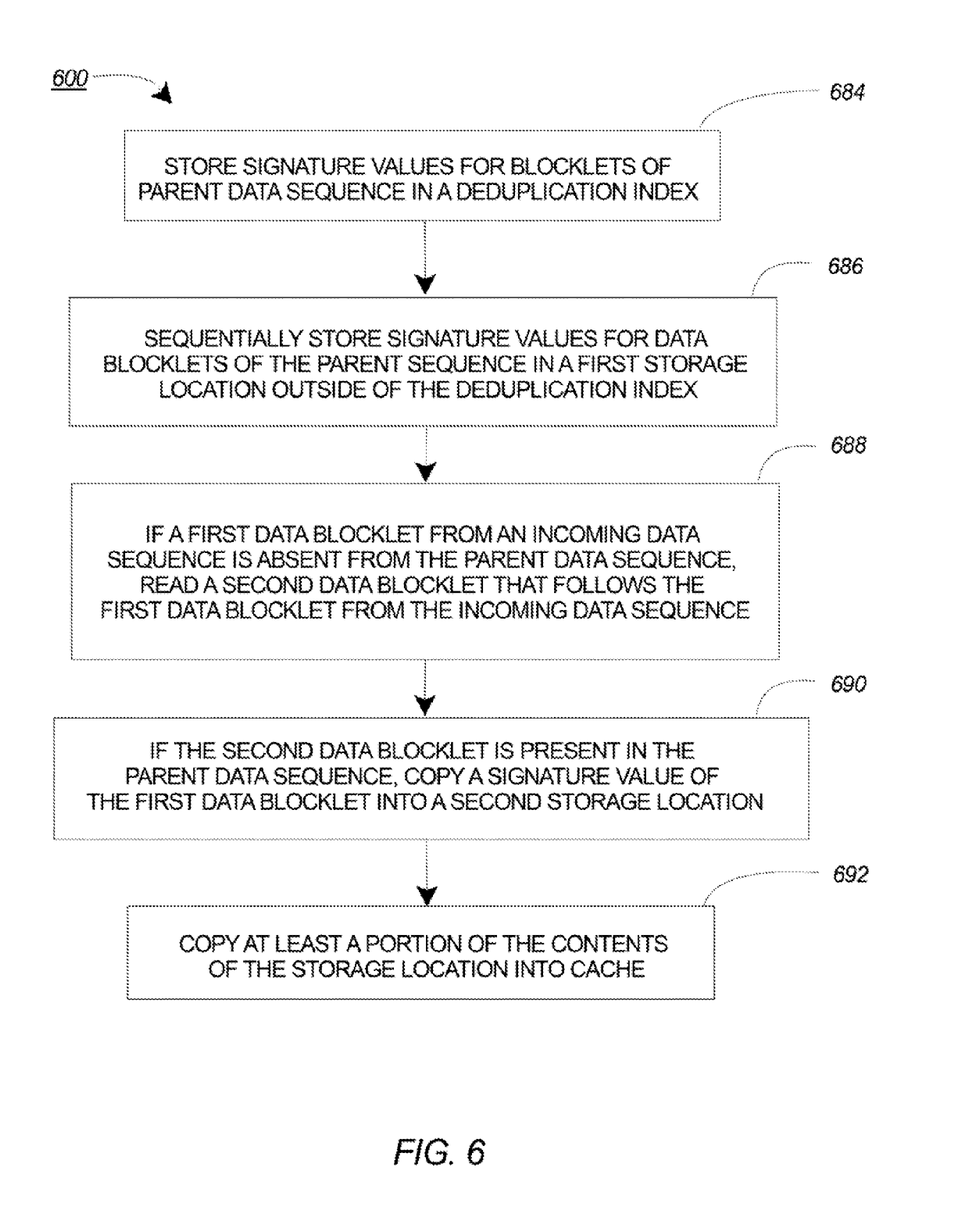
FIG. 6 is a flow diagram illustrating another embodiment of a method for increasing the speed of deduplication.

FIGS. 5 and 6 are flow diagrams (500 and 600, respectively) that include processes which, in various embodiments, are carried out by a processor under the control of computer-readable and computer-executable instructions. In one embodiment, this comprises a processor that is in, or used to implement one or more functions of a storage system such as storage area network. In some embodiments, this includes a processor, such as processor 16A (illustrated in FIG. 1), located in a computer system, such as computer system 10 illustrated in FIG. 1. It is appreciated that the computer-readable and computer-executable instructions for executing the method illustrated by flow diagram 500, or the method illustrated by flow diagram 600, reside, for example, in any tangible computer-readable storage media. Some examples of suitable computer-readable storage media include, but are not limited to, a compact disk read only memory (CD-ROM), a read only memory, a random access memory, and a magnetic storage medium (e.g., a disk or a tape). In some embodiments such computer-readable and computer-executable instructions, reside on computer-readable storage media such as a ROM or firmware of a processor or application specific integrated circuit (ASIC).

Although specific flows of procedures are disclosed in flow diagrams 500 and 600, such flows are provided for example. That is, embodiments are well suited to performing various other procedures or variations of the procedures recited in flow diagrams 500 and/or 600. It is appreciated that, in some embodiments, the procedures in flow diagrams 500 and/or 600 may be performed in different orders than presented, and that not all of the procedures in flow diagrams 500 and/or 600 may be performed in every embodiment.

Example Methods of Increasing the Speed of Deduplication

FIG. 5 illustrates a flow diagram 500 of an example method of increasing the speed of deduplication, according to one embodiment. In various embodiments, the method in flow diagram 500 is implemented with management system 36 of FIG. 2, deduplication engine 38 of FIG. 3, and/or is implemented by or as instructions performed by a computer system, such as, for example, computer system 10 of FIG. 1). Reference will be made to previously described elements of FIGS. 2 and 3 in the description of the method illustrated in flow diagram 500. It is appreciated that the method of flow diagram 500 is implemented at a time following the storing of a data sequence that then becomes a "parent data sequence" on the second and additional times that it is referenced during deduplication activities while receiving a follow-on data stream 466 (illustrated in FIG. 4A).

At step 574, an initial parent data sequence is received, and signature values for blocklets of the data sequence are stored in the deduplication index. As used herein, the signature value may be a hash value such as a 16-byte hash value, as one non-exclusive example. This 16-byte hash value is generated in one embodiment by deduplication engine 38 as part of its normal course of deduplication and is obtained by signature value determiner 130. It is appreciated that the length of a blocklet may vary from approximately 1 kilobyte to 1 megabyte or larger, but that other sizes are possible. It is also appreciated that the lengths of blocklets are, in various embodiments, either fixed or variable, and wide variation in size is possible.

At step 576, signature values for some or all of the data blocklets of the parent sequence are also stored in a first storage location outside of the deduplication index, such as in a cluster header, as one non-exclusive example.

At step 578, while a follow-on data stream is being received that includes signature values of some of the data blocklets of the parent sequence, if a first data blocklet is not recognized by the deduplication engine (e.g., the first data blocklet is absent from the parent data sequence so that no match is found), a signature value for the data blocklet can be stored in a second storage location outside of the deduplication index, such as in a specialized cluster header that is different than the cluster header that stores the signature values for some or all of the data blocklets of the parent sequence. In one embodiment, the specialized cluster header is adapted to store all transition data blocklets.

At step 580, a match for a second data blocklet that follows the first data blocklet (transition blocklet) is attempted by looking in the first storage location. In the event that matching does not immediately occur when a signature value comparison is made, a variety of actions can be taken by deduplication engine prior to reverting to deduplication index to perform a random search for a signature value. In one embodiment, a list of possible actions is arranged from the quickest and least computationally expensive to try to the slowest and most computationally expensive to try.

At step 582, if the second data blocklet is determined to be present in the parent data sequence, i.e. in the first storage location, this is an indication that the order of various data files in the incoming data stream has been shuffled, although no new content is included (at this point) in the data stream. Once this has been determined, at least a portion; if not all, of the contents of the first storage location, e.g., the cluster header containing metadata associated with the second data blocklet, and/or the second storage location, e.g., the specialized cluster header containing metadata associated with the first data blocklet (the transition blocklet) is copied into the cache. By copying some or all of the contents of these cluster headers into the cache, the likelihood is increased that the cache will become populated with signature values for subsequent blocklets in the follow-on data stream 466.

It is recognized that the specific sequence of the steps provided in this embodiment and illustrated in FIG. 5 can be modified somewhat to suit the design requirements of the system. For example, if a first data blocklet is not recognized by the deduplication engine (e.g., the first data blocklet is absent from the parent data sequence so that no match is found) as indicated in part of step 578, a match for a second data blocklet that follows the first data blocklet (transition blocklet) is attempted by looking in the first storage location prior to storing the signature value for the first data blocklet in a second storage location outside of the deduplication index. If a match for the second data blocklet that follows the first data blocklet is found in the parent sequence, such as in the first storage location, a determination that the first data blocklet is a transition blocklet can be made. At this point, the signature value for the first data blocklet can be stored in the second storage location, such as in a specialized cluster header that is different than the first storage location that stores signature values for some or all of the data blocklets of the parent sequence. In this embodiment, the second storage location can be a specialized cluster header that is adapted to only store transition data blocklets, or store all transition data blocklets.

It is also recognized that other intervening events can occur between certain steps in the above processes. For example, in one embodiment, prior to loading the first and/or second storage locations into the cache, deduplication of a second follow-on data sequence that includes signature values of data blocklets of the parent sequence can occur. Once the deduplication engine determines that one of the data blocklets has a signature value in the second storage location (which holds transition blocklets), then at this point the contents of the second storage location are copied into the cache. Stated another way, the system waits to confirm that there is a relatively high likelihood that the contents of the second storage location will be utilized during the deduplication process prior to loading the contents of the second storage location into the cache.

As used herein, the terms "first data blocklet" and "second data blocklet" are provided for ease of reference, and are not intended to represent the actual first or second data blocklet of the data stream. In other words, the terms "first" and "second" are provided to represent that the first data blocklet comes before the second data blocklet in the data stream 466. Further, in one embodiment, the first data blocklet and the second data blocklet are immediately adjacent to one another. However, in an alternative embodiment, the first data blocklet and the second data blocklet can have other data blocklets between the first data blocklet and the second data blocklet.

FIG. 6 illustrates a flow diagram 600 of another example method of increasing the speed of deduplication, according to one embodiment. In various embodiments, the method in flow diagram 600 is implemented with management system of FIG. 2, deduplication engine of FIG. 3, and/or is implemented by or as instructions performed by a computer system, such as, for example, computer system of FIG. 1). Reference will be made to previously described elements of FIGS. 2 and 3 in the description of the method illustrated in flow diagram 600.

At step 684, an initial parent data sequence is received, and signature values for blocklets of the data sequence are stored in the deduplication index.

At step 686, signature values for some or all of the data blocklets of the parent sequence are also stored in a first storage location outside of the deduplication index, such as in a cluster header.

At step 688, while a follow-on data stream is being received, if a first data blocklet is not recognized by the deduplication engine, a match for a second data blocklet that follows the first data blocklet is attempted.

At step 690, if the second data blocklet is determined to be present in the parent data sequence, such as in the first storage location, for example, this is an indication that the order of various data files in the incoming data stream has been shuffled, although no new content is included (at this point) in the data stream. Once this has been determined, a signature value of the first data blocklet is copied into a second storage location that specifically stores signature values for transition blocklets. In one embodiment, the second storage location can include a cluster that can be associated with a cluster header that includes metadata of a data blocklet that precedes the first data blocklet. Alternatively, the cluster can be associated with a cluster header that includes metadata of the second data blocklet. Still alternatively, the first data blocklet can be copied into a cluster that is not associated with any of the data blocklets that surround the first data blocklet. In one embodiment, one cluster can be designated to receive only unrecognized data blocklets similar to the first data blocklet.

At step 692, at least a portion, if not all, of the contents of the second storage location, e.g., the cluster header containing metadata associated with the second data blocklet, is copied into the cache.

Using the methods provided herein, the cache is preloaded with what are anticipated to be likely matches of future data blocklets in the follow-on data stream. Thus, once it is determined that an unrecognizable transition blocklet is positioned between two recognizable data blocklets, the deduplication engine concludes that shuffling of data has occurred in the follow-on data stream. Because the unrecognized data blocklet is eventually searched in the deduplication index, this relatively slow and costly procedure ultimately includes retrieval and loading of a relevant cluster header into the cache, where it is expected to be utilized because data in the follow-on data stream is believed to have no new content as a result of having simply been shuffled. Therefore, future transition blocklets in the follow-on data stream will likely be followed by recognizable blocklets or series of blocklets, which have a relatively high degree of likelihood of being included in the cluster header that has been preloaded into the cache. With this design, the incidence of searching the primary index is decreased, which increases the efficiency of the deduplication engine, resulting in an overall time savings and/or an increase in performance of the system.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for deduplicating an incoming data sequence, the method comprising the steps of:
   storing signature values for a plurality of data blocklets of a parent data sequence in a deduplication index;
   sequentially storing signature values for at least some of the plurality of data blocklets of the parent data sequence in a first storage location outside of the deduplication index;
   determining that a first data blocklet in the incoming data sequence is absent from the parent data sequence;
   storing a signature value for the first data blocklet in a second storage location outside of the deduplication index;
   determining that a second data blocklet that follows the first data blocklet in the incoming data sequence is present in the parent data sequence, the second data blocklet having a signature value that is stored in the first storage location; and
   copying at least a portion of the contents of the second storage location into a cache to expedite access during deduplication of the incoming data sequence.

2. The method of claim 1 wherein the cache is included as part of a computer usable volatile memory.

3. The method of claim 1 wherein at least one of the storage locations includes a cluster header.

4. The method of claim 1 wherein each of the storage locations includes a cluster header.

5. The method of claim 1 wherein the second storage location includes a cluster header that is designated to only receive data blocklets that are absent from the parent data sequence.

6. The method of claim 1 wherein the first data blocklet immediately follows another data blocklet that was found to be present in the parent data sequence.

7. The method of claim 1 wherein the second data blocklet immediately follows the first data blocklet in the incoming data sequence.

8. The method of claim 1 wherein the second data blocklet is spaced apart from the first data blocklet in the incoming data sequence by at least one other data blocklet.

9. The method of claim 1 wherein the step of copying includes copying the entire contents of the second storage location into the cache.

10. The method of claim 1 further comprising the step of storing a link in the first storage location, the link linking one of the data blocklets of the parent data sequence to the first data blocklet.

11. The method of claim 1 further comprising the step of storing a guarded link in the second storage location, the guarded link linking the first data blocklet to the second data blocklet.

12. The method of claim 11 wherein the step of copying includes copying the guarded link from the second storage location into the cache.

13. A deduplication engine of a computer system, the deduplication engine utilizing the method of claim 1 to deduplicate the incoming data sequence.

14. A computer-implemented method for deduplicating an incoming data sequence, the method comprising the steps of:
    storing signature values for a plurality of data blocklets of a parent data sequence in a deduplication index;
    sequentially storing signature values for at least some of the plurality of data blocklets of the parent data sequence in a first storage location outside of the deduplication index;
    locating a transition data blocklet that is absent from the parent data sequence;
    sequentially storing a signature value for the transition data blocklet into a second storage location outside the deduplication index;
    determining that a signature value for a data blocklet that follows the transition data blocklet is included in the first storage location; and
    copying at least a portion of the contents of the second storage location into a cache to expedite access during deduplication of the incoming data sequence.

15. The method of claim 14 wherein the data blocklet that follows the transition data blocklet is immediately adjacent to the transition data blocklet.

16. The method of claim 14 wherein the cache is included as part of a computer usable volatile memory.

17. The method of claim 14 wherein at least one of the storage locations includes a cluster header.

18. The method of claim 14 wherein each of the storage locations includes a cluster header.

19. The method of claim 14 wherein the second storage location includes a cluster header that is designated to only receive data blocklets that are absent from the parent data sequence.

20. The method of claim 14 further comprising the step of determining that a data blocklet that immediately precedes the transition data blocklet in the incoming data sequence is present in the parent data sequence.

21. The method of claim 14 wherein the step of copying includes copying the entire contents of the second storage location into the cache.

22. The method of claim 14 further comprising the step of storing a link in the first storage location, the link linking one of the data blocklets of the parent data sequence to the transition data blocklet.

23. The method of claim 14 further comprising the step of storing a guarded link in the second storage location, the guarded link linking the transition data blocklet to the data blocklet that follows the transition data blocklet.

24. The method of claim 23 wherein the step of copying includes copying the guarded link from the second storage location into the cache.

25. A deduplication engine of a computer system, the deduplication engine utilizing the method of claim 14 to deduplicate the incoming data sequence.

26. A computer-implemented method for deduplicating an incoming data sequence, the method comprising the steps of:

storing signature values for a plurality of data blocklets of a parent data sequence in a deduplication index;

sequentially storing signature values for at least some of the plurality of data blocklets of the parent data sequence in a first cluster header outside of the deduplication index;

locating a transition data blocklet that is absent from the parent data sequence;

determining that a data blocklet that immediately precedes the transition data blocklet in the incoming data sequence is present in the parent data sequence;

determining that a signature value for a data blocklet that immediately follows the transition data blocklet is included in the first cluster header;

storing a signature value for the transition data blocklet into a second cluster header that is designated to receive only transition data blocklets that are absent from the parent data sequence;

storing a link in a first storage location, the link linking one of the data blocklets of the parent data sequence to the transition data blocklet;

storing a guarded link in the second cluster header, the guarded link linking the transition data blocklet to the data blocklet that follows the transition data blocklet; and copying the contents of the second cluster header into a cache that is embedded in a computer usable volatile memory to expedite access during deduplication of the incoming data sequence.

* * * * *